US012801361B2

(12) United States Patent
Stormer et al.

(10) Patent No.: US 12,801,361 B2
(45) Date of Patent: Nov. 17, 2026

(54) NETWORK DATA PROCESSING

(71) Applicant: Truist Bank, Charlotte, NC (US)

(72) Inventors: Natalie Renee Stormer, Raleigh, NC (US); Dylan Zachary Bush, Woodstock, GA (US)

(73) Assignee: TRUIST BANK, Charlotte, NC (US)

(*) Notice: Subject to any disclaimer, the term of this patent is extended or adjusted under 35 U.S.C. 154(b) by 286 days.

(21) Appl. No.: 18/654,716

(22) Filed: May 3, 2024

(65) Prior Publication Data

US 2025/0342025 A1 Nov. 6, 2025

(51) Int. Cl.

| | |
|---|---|
| ***H04L 67/00*** | (2022.01) |
| ***G06F 8/61*** | (2018.01) |
| ***G06N 3/08*** | (2023.01) |
| ***G06N 20/00*** | (2019.01) |
| ***G06Q 40/02*** | (2023.01) |

(52) U.S. Cl.

CPC ................. *G06F 8/61* (2013.01); *G06N 3/08* (2013.01); *G06N 20/00* (2019.01); *G06Q 40/0222* (2025.08); *H04L 67/34* (2013.01)

(58) Field of Classification Search

CPC ........... G06F 8/61; H04L 67/34; G06N 20/00; G06N 3/08

See application file for complete search history.

(56) References Cited

U.S. PATENT DOCUMENTS

| | | | | |
|---|---|---|---|---|
| 2010/0217701 | A1* | 8/2010 | Mesilaty | G06Q 40/02 715/764 |
| 2017/0323345 | A1* | 11/2017 | Flowers | G06Q 30/0269 |
| 2024/0420103 | A1* | 12/2024 | Coles | G06N 20/00 |

FOREIGN PATENT DOCUMENTS

JP 2023055480 A * 4/2023

OTHER PUBLICATIONS

Dannelind, Martin, Forecasting checking account balance using supervised machine learning, Independent thesis, Uppsala University, Jun. 2022, 54 pages, [retrieved on Apr. 9, 2026], Retrieved from the Internet: < URL: https://www.diva-portal.org/smash/record.jsf?pid=diva2%3A1676217&dswid=3841>.*

* cited by examiner

*Primary Examiner* — Geoffrey R St Leger
(74) *Attorney, Agent, or Firm* — Michael A. Springs, Esq.; Shumaker, Loop & Kendrick, LLP; Patrick B. Horne

(57) ABSTRACT

Systems and methods for network data processing are disclosed. The system comprises a computing system with at least one processing device and at least one memory device, wherein the computing system executes computer-readable instructions. A network connection operatively connects at least one user device and the computing system. Upon execution of the computer-readable instructions, the computing system is configured to: receive, via user software application installed on the at least one user device, a request for a user-specific output for a desired date; predict, via the computing system, one or more user-specific transactions occurring before and/or on the desired date; predict, via the computing system, the user-specific output for the desired date based upon the one or more predicted user-specific transactions; and display, via the user software application, the predicted user-specific output on a graphical user interface of the at least one user device.

12 Claims, 8 Drawing Sheets

NETWORK DATA PROCESSING

FIELD

This invention relates generally to the field of data processing, and more particularly embodiments of the invention relate to systems and methods to improve network data processing by predicting transactions and outputs of the systems.

BACKGROUND

Enterprises such as financial institutions and various other types of commercial businesses maintain financial accounts of users. Typically, an account balance is calculated by adding credits and subtracting debits. Oftentimes, the enterprises may also factor in any accrued interest based on the account type and interest rate. Simply, it is a process of tracking inflows and outflows. Conventionally, the account balance is calculated using only the credits and debits known to the enterprise at a particular point in time. This, however, has several drawbacks. One such drawback is that the user may inadvertently overspend because the account balance provided by the enterprise is not inclusive of all outstanding credits and debits. This may lead to overdraft fees if there are insufficient funds in the account to cover pending transactions. Also, the user may miss payments on bills or other financial obligations if unaware of the actual account balance, which may result in late fees or other penalties. Unpaid bills or overdrafts resulting from not knowing the actual account balance can negatively impact a user's credit score over time, affecting the user's ability to access credit or loans in the future. Without an accurate understanding of the actual account balance, the user may find it difficult to budge effectively, potentially leading to financial stress or the inability to meet financial goals. The user may also miss opportunities to take advantage of favorable financial situations such as investing or saving when there is a surplus of funds available. Overall, not knowing the actual account balance inclusive of all outstanding transactions can result in financial instability, missed opportunities, and unnecessary expenses.

Thus, it would be desirable for systems and methods that improve network data processing, while enhancing user engagement and satisfaction.

SUMMARY

In concordance and agreement with the presently described subject matter, systems and methods that improve network data processing, while enhancing user engagement and satisfaction, have been newly designed. Shortcomings of the prior art are overcome and additional advantages are provided through the systems and the methods in accordance with the present disclosure.

In one embodiment, a method of network data processing, comprises: providing a computing system including at least one processing device and at least one memory device, wherein the computing system executes computer-readable instructions; providing a network connection operatively connecting at least one user device and the computing system, the network connection configured to permit network data flow between the at least one user device and the computing system; providing, via a graphical user interface of the at least one user device, a user software application to a user for installation on the at least one user device, wherein the at least one user device is configured to wirelessly communicate with the computing system via the user software application; predicting, via the computing system, a user-specific output for a desired date; and displaying, via the user software application, the predicted user-specific output on the graphical user interface of the at least one user device.

In some embodiments, the predicted user-specific output has a percentage of accuracy relative to an actual output greater than a percentage of accuracy of a conventional output relative to the actual output for the desired date.

In some embodiments, the method further comprises receiving, via the user software application installed on the at least one user device, a request for the predicted user-specific output.

In some embodiments, the method further comprises receiving, via the user software application installed on the at least one user device, the desired date.

In some embodiments, the method further comprises transmitting, via the computing system, an electronic communication related to the predicted user-specific output to the at least one user device.

In some embodiments, the method further comprises predicting, via the computing system, one or more user-specific transactions occurring before and/or on the desired date.

In some embodiments, the predicted user-specific output includes the one or more predicted user-specific transactions.

In some embodiments, the method further comprises: receiving, via the user software application installed on the at least one user device, personal data of the user; generating, via the computing system, a personal data set based upon the personal data of the user; initiating a machine learning program as a predictive model; and applying the personal data set to the predictive model.

In some embodiments, the step of predicting, via the computing system, the one or more user-specific transactions includes applying the personal data set to the predictive model.

In some embodiments, the step of predicting, via the computing system, the user-specific output for the desired date includes applying the personal data set to the predictive model.

In another embodiment, a method of network data processing, comprises: providing a computing system including at least one processing device and at least one memory device, wherein the computing system executes computer-readable instructions; providing a network connection operatively connecting at least one user device and the computing system, the network connection configured to permit network data flow between the at least one user device and the computing system; providing, via a graphical user interface of the at least one user device, a user software application to a user for installation on the at least one user device, wherein the at least one user device is configured to wirelessly communicate with the computing system via the user software application; receiving, via the user software application installed on the at least one user device, personal data of the user; generating, via the computing system, a personal data set based upon the personal data of the user; initiating a machine learning program as a predictive model; applying the personal data set to the predictive model; receiving, via the user software application installed on the at least one user device, a request for a predicted user-specific output for a desired date; predicting, via the computing system, one or more user-specific transactions occurring before and/or on the desired date; predicting, via the computing system, a user-specific output for the desired date based upon the one or more predicted user-specific transactions; and displaying, via the user software application, the predicted user-specific output on the graphical user interface of the at least one user device.

In yet another embodiment, a system for network data processing, comprises: a computing system with at least one processing device and at least one memory device, wherein the computing system executes computer-readable instructions; and a network connection operatively connecting at least one user device and the computing system, the network connection configured to permit network data flow between the at least one user device and the computing system; wherein, upon execution of the computer-readable instructions, the computing system is configured to: provide, via a graphical user interface of the at least one user device, a user software application to a user for installation on the at least one user device, wherein the at least one user device is configured to wirelessly communicate with the computing system via the user software application; predict, via the computing system, a user-specific output for a desired date; and display, via the user software application, the predicted user-specific output on the graphical user interface of the at least one user device.

In some embodiments, upon execution of the computer-readable instructions, the computing system is further configured to receive, via the user software application installed on the at least one user device, a request for the predicted user-specific output.

In some embodiments, upon execution of the computer-readable instructions, the computing system is further configured to receive, via the user software application installed on the at least one user device, the desired date.

In some embodiments, upon execution of the computer-readable instructions, the computing system is further configured to transmit an electronic communication related to the predicted user-specific output to the at least one user device.

In some embodiments, upon execution of the computer-readable instructions, the computing system is further configured to predict, via the computing system, one or more user-specific transactions occurring before and/or on the desired date.

In some embodiments, upon execution of the computer-readable instructions, the computing system is further configured to: receive, via the user software application installed on the at least one user device, personal data of the user; generate, via the computing system, a personal data set based upon the personal data of the user; initiate a machine learning program as a predictive model; and apply the personal data set to the predictive model.

In some embodiments, the one or more predicted user-specific transactions are predicted by applying the personal data set to the predictive model.

In some embodiments, the predicted user-specific output for the desired date is predicted by applying the personal data set to the predictive model.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
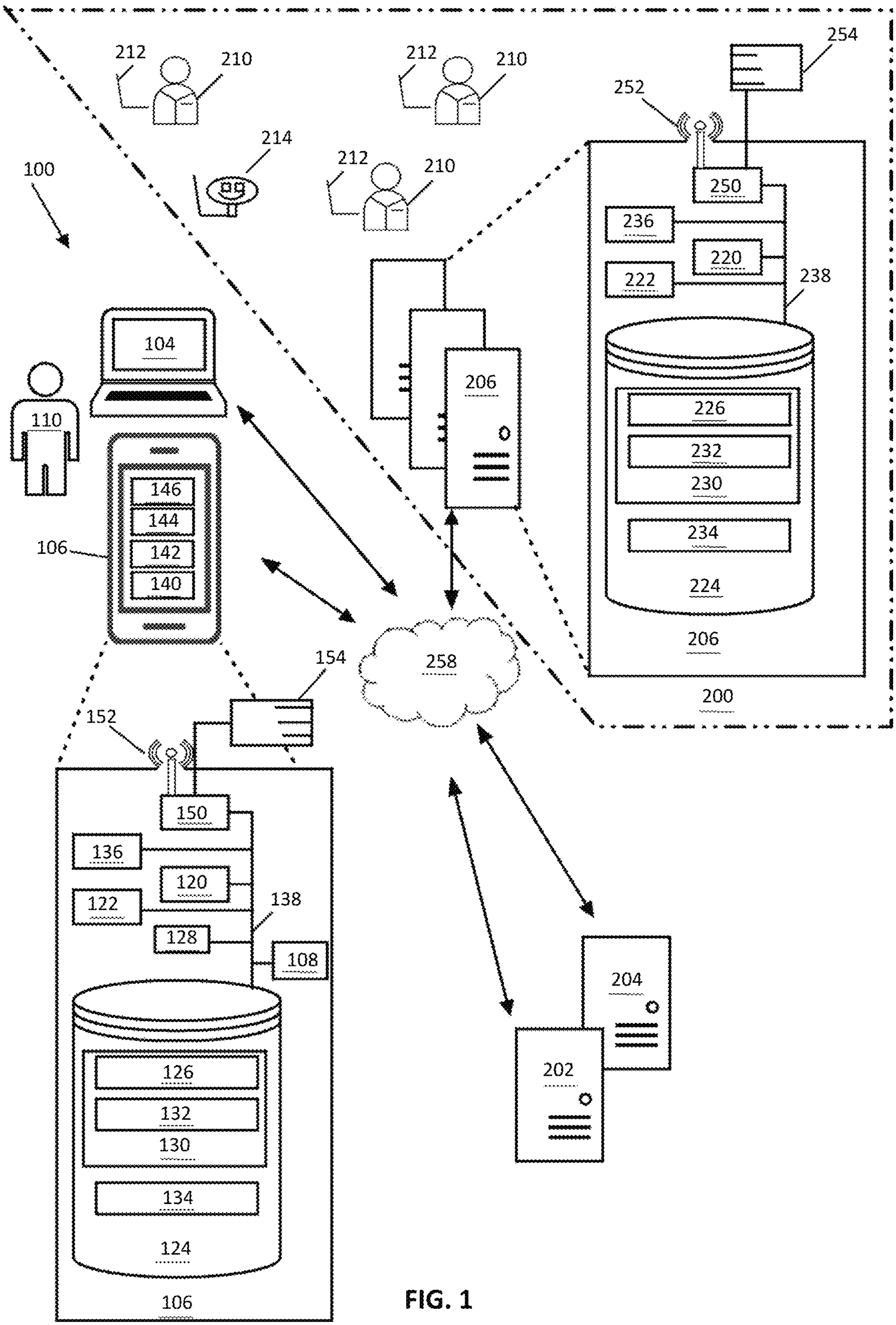
FIG. 1 is a schematic diagram illustrating an enterprise system and environment thereof for implementing a data privacy management system and method in accordance with an embodiment of the presently described subject matter.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Like numbers refer to like elements throughout. Unless defined otherwise, technical and scientific terms used herein have the same meaning as commonly understood to one of ordinary skill in the art to which the presently disclosed subject matter pertains.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

The specification may include references to "one embodiment," "an embodiment," "various embodiments," "one or more embodiments," etc. may indicate that the embodiment (s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Furthermore, a device or structure that is configured in a certain way is configured in at least that way, but may also be configured in ways that are not listed.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains," or uses similar language to describe one or more steps or elements possesses those one or more steps or elements, but is not limited to possessing only those one or more steps or elements.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

As used herein, the terms "enterprise" or "provider" generally describes a person or business enterprise (e.g., company, organization, institution, business, university, etc.) that hosts, maintains, or uses computer systems that provide functionality for the disclosed systems and methods. The term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a computing environment 100 that includes a computer system to provide access to a video game to a user device system, according to at least one embodiment of the present invention. The computing environment 100 generally includes a user 110 (e.g., customer of the enterprise) that benefits through use of services and products offered by an enterprise system 200. Use of the words "service(s)" or "product(s)" as used herein can be interchangeable. The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The computing environment 100 may include, for example, a distributed cloud computing environment (e.g., a private cloud, public cloud, community cloud, and/or hybrid cloud), an on-premise environment, fog-computing environment, and/or an edge-computing environment. The user 110 accesses services and/or products of the enterprise system 200 by use of one or more user devices, illustrated in separate examples as user devices 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device 104, 106 may be and/or include a workstation, a server, a set of servers, a cloud-based application or system, or any other suitable system or device adapted to execute any suitable operating system used on personal computers, central computing systems, phones, and/or other devices.

The user device 104, 106, but as illustrated with specific reference to the mobile device 106, includes at least one of each of a processor 120, and a memory device 122 for processing use, such as random access memory (RAM), and read-only memory (ROM), and other various components. The illustrated mobile device 106 further includes a storage device 124 including at least one of a non-transitory storage medium, such as a microdrive, for long-term, intermediate-term, and short-term storage of computer-readable program instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and/or other data items preferred by the user or otherwise required or related to any or all of the applications or programs 130.

The memory device 122 is operatively coupled to the processor 120. As used herein, memory device 122 includes store any computer readable medium configured to store data, code, and/or other information. The memory device 122 may include volatile memory, such as volatile Random Access Memory (RAM), and/or a cache area for the temporary storage of data. The memory device 122 may also include non-volatile memory and may be embedded and/or may be removable. The non-volatile memory additionally or alternatively can include an electrically erasable programmable read-only memory (EEPROM), flash memory, or the like.

According to various embodiments, the memory device 122 and storage device 124 may be combined into a single storage medium. The memory device 122 and storage device 124 can store any of a number of applications or programs 130 that comprise computer-executable program instructions or code executed by the processing device 120 to implement, via the user device 104, 106, the functions described herein. For example, the memory device 122 may store applications 132 and/or association data related to a conventional web browser application and/or an enterprise-distributed application (e.g., a mobile application). These applications 132 also typically provide a graphical user interface (GUI) that is displayed via the display 140 that allows the user 110 to perform functions via the application including to communicate, via the user device 104, 106 with the enterprise system 200, and/or other devices or systems.

The GUI on the display 140 may include features for displaying information and accepting inputs from users, and may include input controls such as fillable text boxes, data fields, hyperlinks, pull down menus, check boxes, radio buttons, and the like.

In various embodiments, the user 110 may download, sign into, or otherwise access the application 132 from an enterprise system 200 or from a distinct application server. In other embodiments, the user 110 interacts with the enterprise system 200 via a web browser application 132 in addition to, or instead of, the downloadable version of the application 132.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 may also include the functionality to encode and interleave messages and data prior to modulation and transmission. The processing device 120 can additionally include an internal data modem to convert data from digital format to a format suitable for analog transmission. Further, the processing device 120 may include functionality to operate one or more software programs, which may be stored in the memory device 122 or in the storage device 124. For example, the processing device 120 may be capable of operating a connectivity program such as a web browser application 132. The web browser application 132 may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information and data that are used by the user device 104, 106 as well as the applications and devices that facilitate functions of the user device 104, 106, or that are in communication with the user device 104, 106, to implement the functions described herein, and other functions not expressly described. For example, the storage device 124 may include user authentication information data as well as other data.

The processing device 120, in various examples, can operatively perform calculations, can process instructions for execution, and can manipulate information. The processing device 120 can execute machine-executable program instructions stored in the storage device 124 and/or memory device 122 to perform the methods and functions as described or implied herein. Specifically, the processing device 120 can execute machine-executable instructions to perform actions as expressly provided in one or more corresponding flow charts and/or block diagrams or as would be impliedly understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to and processed by the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and the enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning System (GPS) transceiver configured to be used by a positioning system to determine a location of the computing device 104 or mobile device 106. In some embodiments, the positioning system device 108 includes an antenna, transmitter, and receiver. In one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), electrically connects the various described, illustrated, and implied components of the mobile device 106. The intraconnect 138, in various non-limiting examples, can include or represent, a system bus, a high-speed interface connecting the processing device 120 to the memory device 122, providing electrical connections among the components of the mobile device 106, and may include electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide wired (e.g., via wired or docked communication by electrically conductive connector 154) or wireless (e.g., via wireless communication device 152) two-way communications and data exchange. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Wireless communications may be conducted via the wireless communication device 152, which can include, as non-limiting examples, a radio-frequency transceiver, a Bluetooth device, Wi-Fi device, a Near-field communication device, and other transceivers. In addition, GPS connections may be included for ingoing and/or outgoing navigation and location-related data exchanges. Wired communications may be conducted, e.g., via the connector 154, by USB, Ethernet, and/or other physically connected modes of data transfer.

The processing device 120 may, for example, be configured to use the communication interface 150 as a network interface to communicate with one or more other devices on a network. In this regard, the communication interface 150 utilizes the wireless communication device 152 such as an antenna operatively coupled to a transmitter and a receiver (or together a "transceiver") included with the communication interface 150. The processing device 120 is configured to provide signals to and receive signals from the transmitter and receiver, respectively. In various embodiments, the signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, and/or fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), with fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and/or products to one or more users 110. In non-limiting examples, services and/or products may include retail services and products, information services and products, custom services and products, predefined or pre-offered services and products, consulting services and products, advising services and products, forecasting services and products, internet products and services, social media, data hosting, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

The network 258 provides wireless or wired communications among the components of the system 100 and the environment thereof, including other devices local or remote to those illustrated, such as additional mobile devices, servers, and other devices communicatively coupled to the network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, systems, entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes. The enterprise system 200 may communicate with the external system 202, 204 using any combination of public or private communication.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
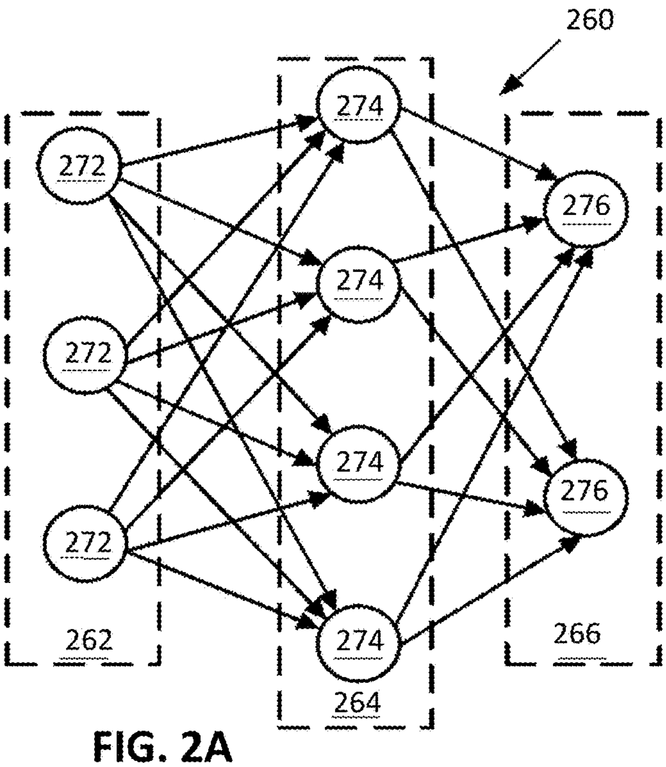
FIG. 2A is a diagram of a feedforward network, according to at least one embodiment, utilized in machine learning.
Figure 2C:
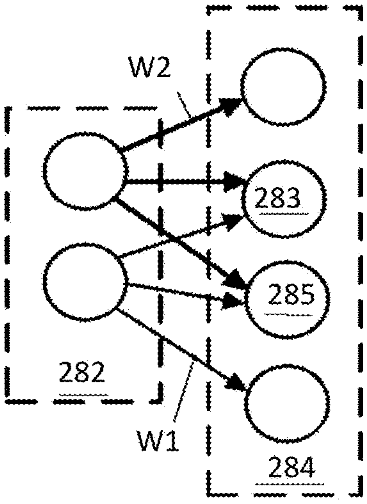
FIG. 2C is a diagram of a portion of the convolution neural network of FIG. 2B, according to at least one embodiment, illustrating assigned weights at connections or neurons.
Figure 2B:
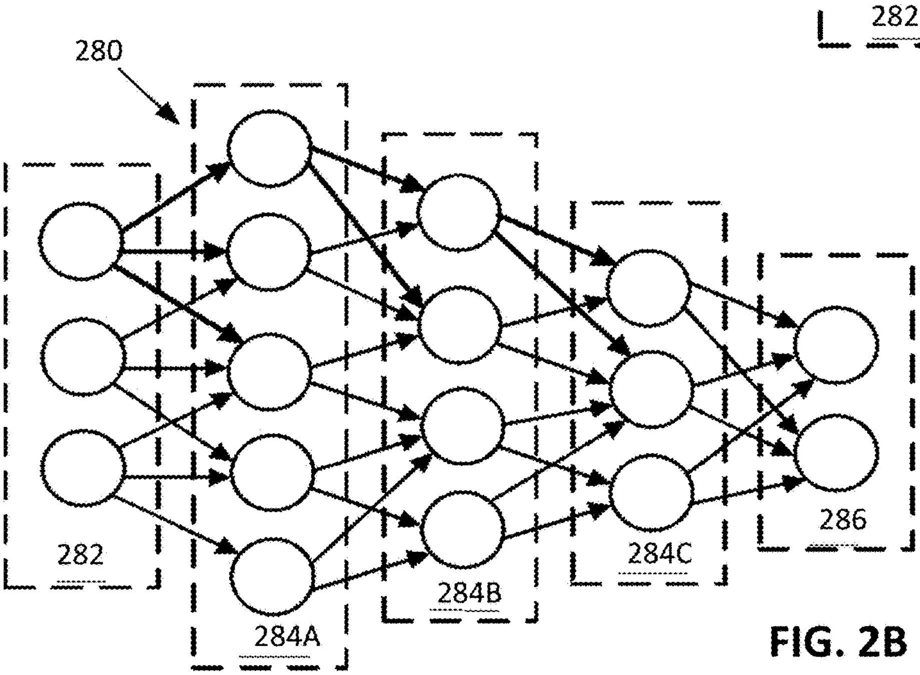
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
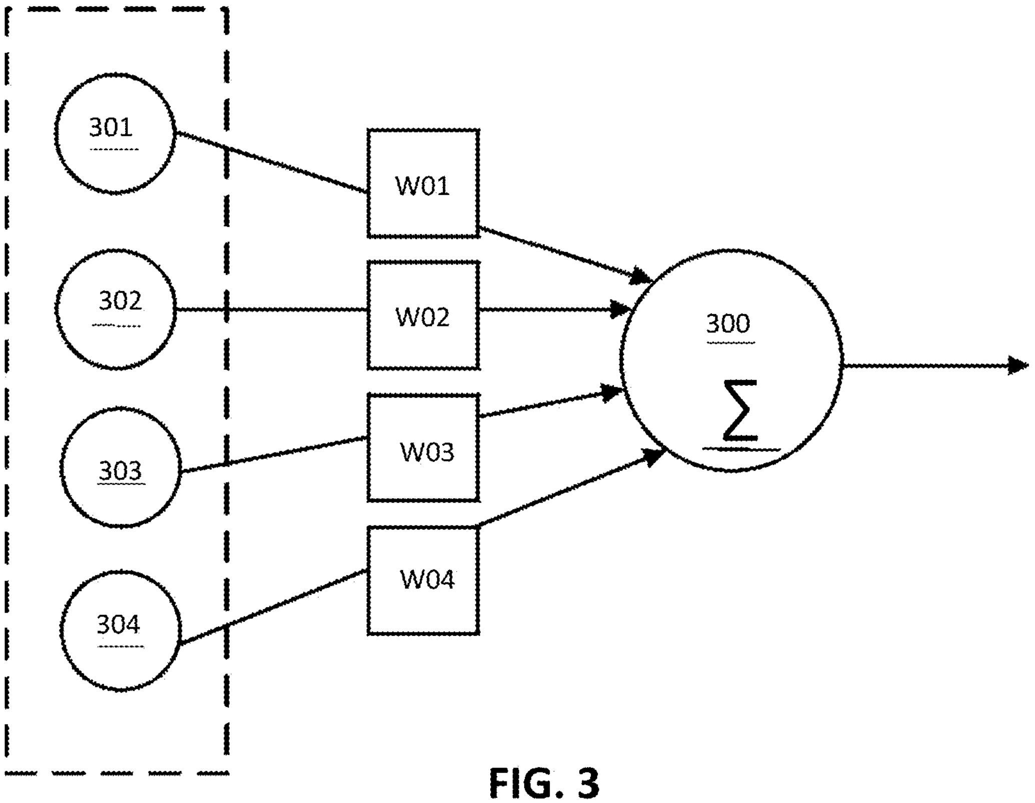
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
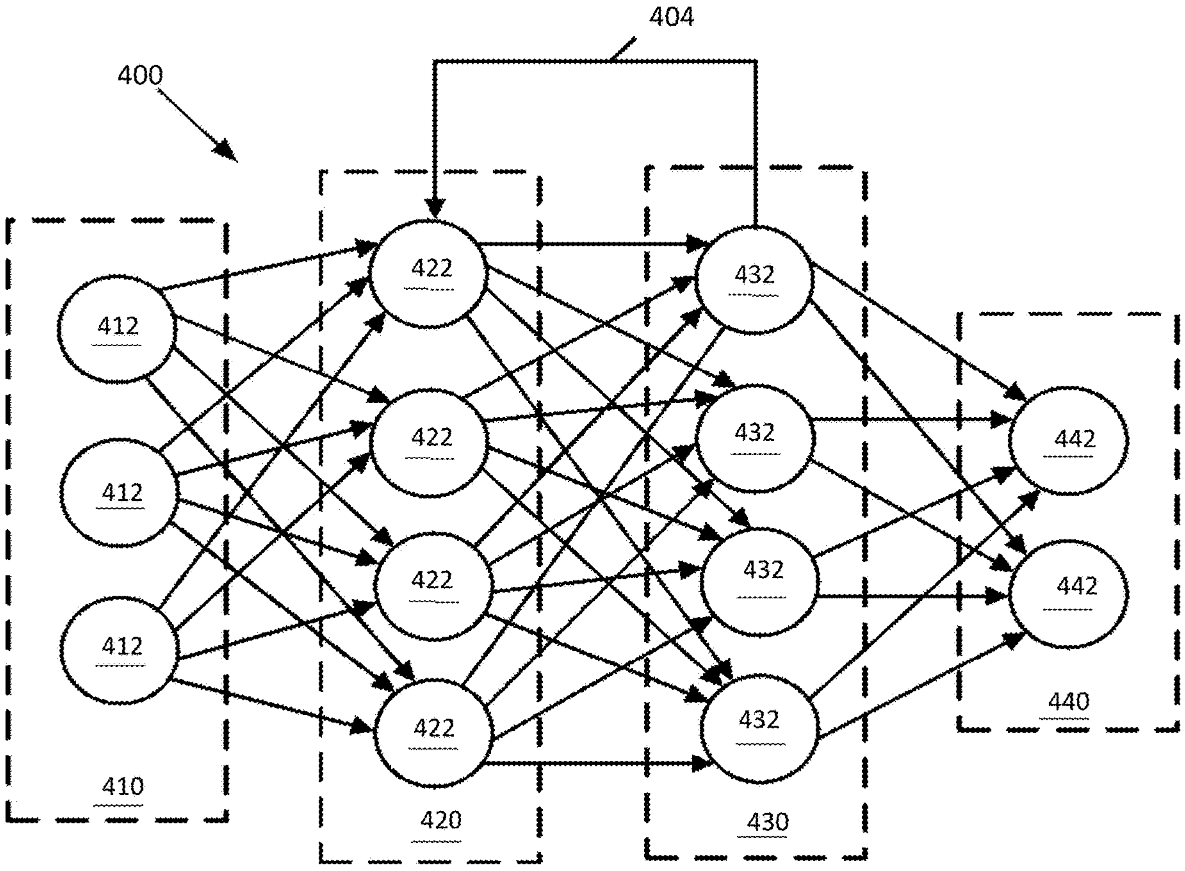
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
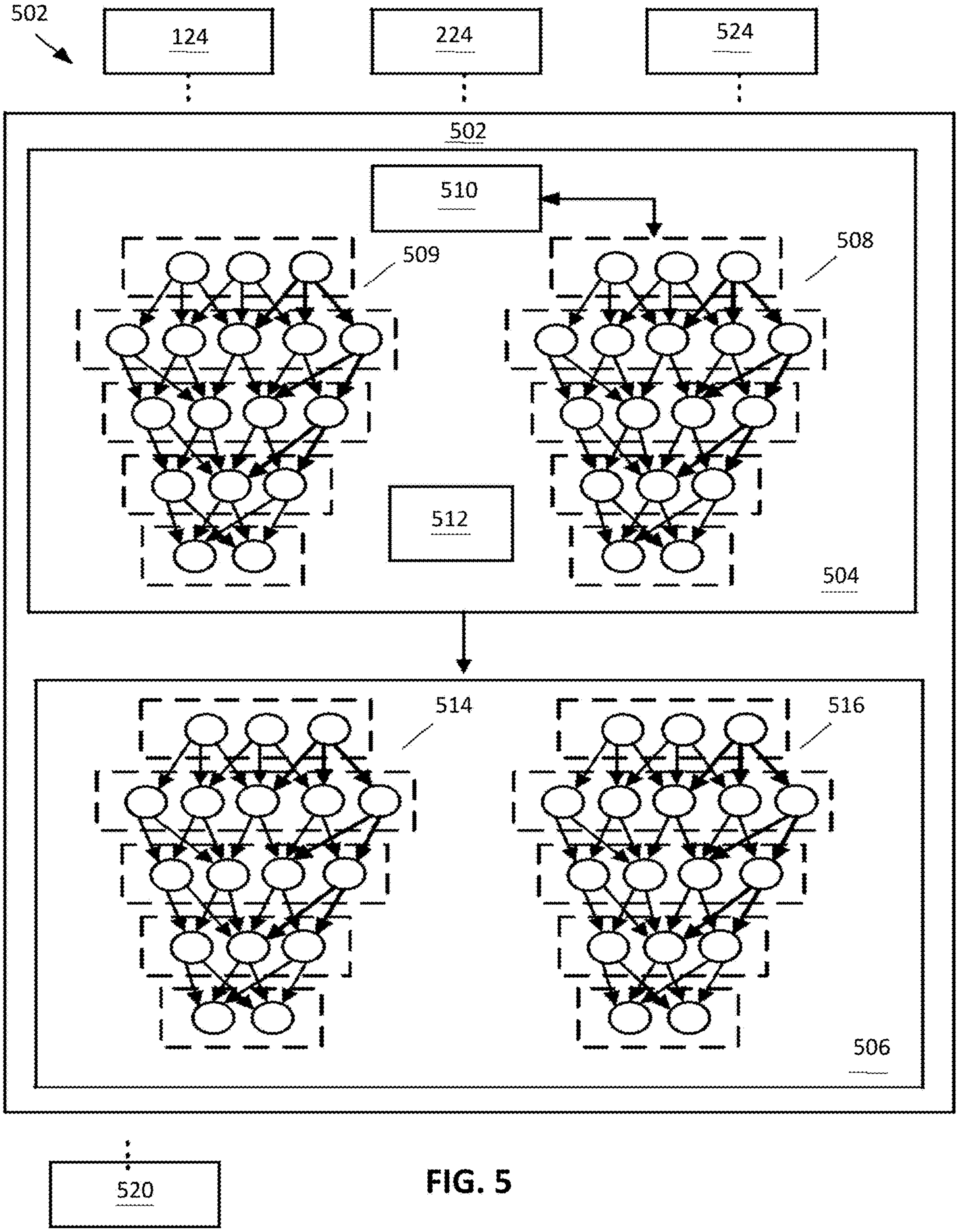
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 124, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing).

For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
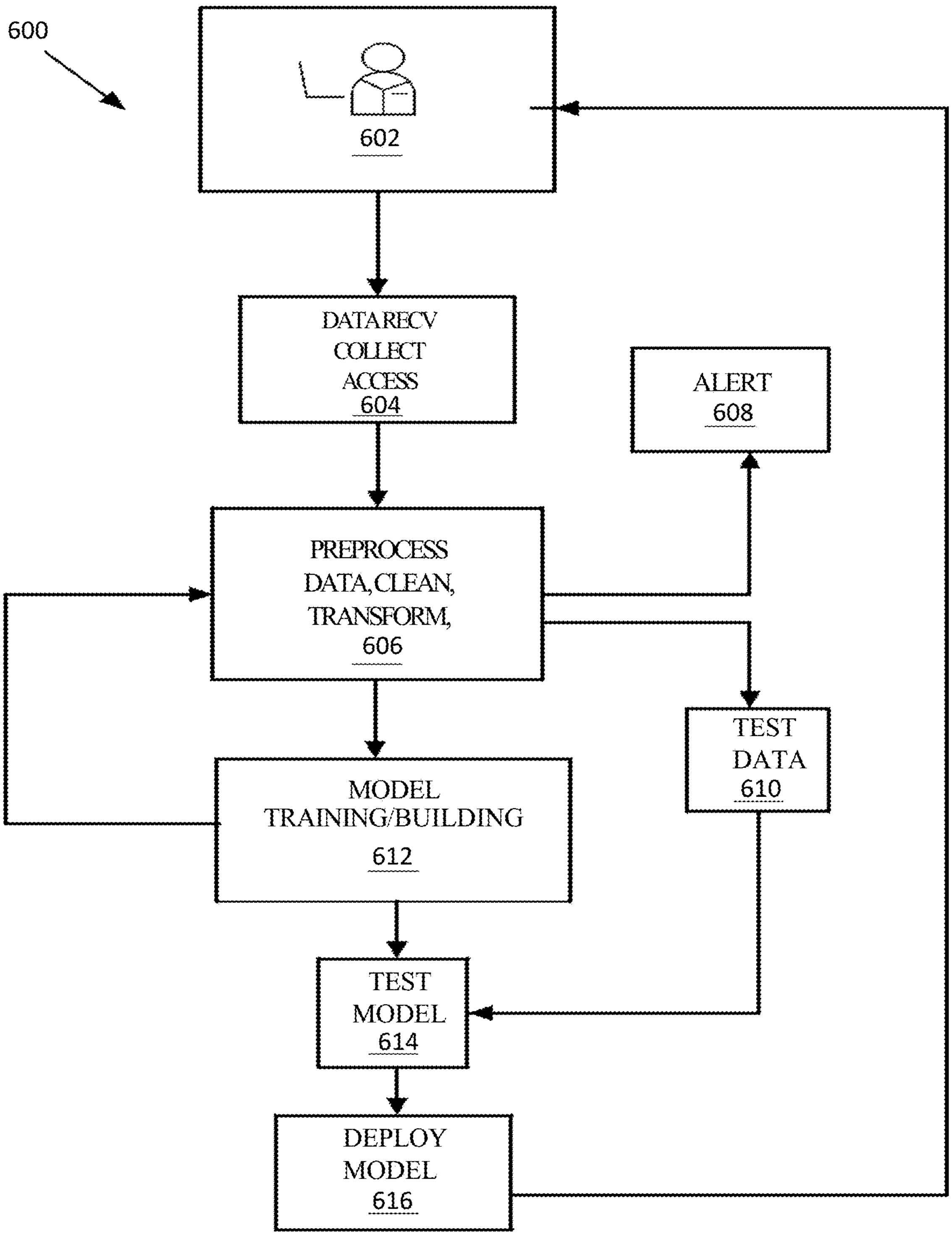
FIG. 6 is a flow diagram illustrating a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

The present invention relates to a method of operating the described enterprise system 200 for interacting with a corresponding user 110 accessing a mobile banking platform associated with the enterprise system 200. As used herein, the mobile banking platform generally refers to a platform that is accessible to the user 110 via an appropriate network connection, such as a mobile banking website or a mobile banking application. If the mobile banking platform refers to a mobile banking website, the user 110 may access the website via an appropriate browser software application 132 operating on the corresponding user device 104, 106, wherein navigation of the mobile banking website provides the user 110 access to certain data regarding the user 110 as maintained by the enterprise system 200. If the mobile banking platform refers to a mobile banking software application, the user 110 may access the mobile banking software application via the corresponding user device 104, 106 for access to the data regarding the user 110 as maintained by the enterprise system 200 in the absence of the operation of the previously described browser application. The mobile banking software application may be representative of the previously described application 132 operable on the user device 106, as one non-limiting example.

It is generally assumed hereinafter that the same features of the mobile banking platform may be accessible via use of the website accessible via the browser application or the direct use of the mobile banking software application 132, unless specified otherwise. It should also be generally understood that the website and the software application 132 may generally include the display of the same data regarding the user 110, but may in some circumstances include a different arrangement of such data to best accommodate the configuration of the corresponding user device 104, 106, such as accommodating a specific screen configuration or a specific user input method. The mobile banking platform is described hereinafter as being "interacted with" by the user 110 during navigation thereof. It should be understood that such interactions may refer to any suitable interactions capable as acting as an input to the corresponding user device 104, 106, such as a corresponding touch screen interaction, mouse button click, keyboard stroke, voice activated command, or the like, as the circumstances may warrant. Such interactions are generally understood to correspond to a selection of an identifiable area of the display of the mobile banking platform, such as corresponding to a specific image, video display, text, or other representation of data, which in turn redirects the platform to change the data instantaneously displayed to the user 110 via a reconfiguration of the corresponding graphical user interface.

The mobile banking platform is shown and described hereinafter with reference to the navigation of a dedicated mobile banking software application 132 as may be executed on the user device 106 having the described display 140 acting as the graphical user interface thereof. However, as described above, it should be readily apparent that the same features may be applied to the corresponding software application 132 or browser application 132 during use of the user device 104 and any associated input or output devices thereof.

As mentioned hereinabove, each of the users 110 described herein may be a person or entity acting as a customer or client of the enterprise system 200 that utilizes products and/or services from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and a corresponding user 110 may include the user 110 having a user account with the enterprise system 200 wherein certain actions of the user 110, actions of the enterprise system 200, and/or interactions between the enterprise system 200 and the user 110 may be monitored and recorded by the computing system 206 of the enterprise system 200. Such data of each of the users 110 of the enterprise system 200 may be in the form of the data 234 stored to the storage device 224 of the computing system 206 as utilized for carrying out the functions of the mobile banking platform as described herein. The data 234 may originate from various different sources including the recorded interactions of the user 110 with the enterprise system 200 and/or the recorded interactions of the user 110 with one or more third-party and external sources or systems, which may be representative of the previously disclosed external systems 202, 204.

The user account of each corresponding user 110 may refer to a primary or umbrella account of the user 110 from which data corresponding to various additional or subaccounts is accessible during navigation of the mobile banking platform. For example, upon providing the necessary login credentials to access the corresponding user account via the mobile banking platform, the logged-in user 110 may then be able to access each of a variety of different financial accounts maintained by the enterprise system 200 and associated with the user 110. As one non-limiting example, the user account of the user 110 may include access to each of a checking account, a savings account, and a credit card account, each of which is maintained or monitored in some form by the enterprise system 200 and associated with the user 110. However, the user account may include access to any form of financial account including a record of financial transactions associated with the financial account, such as debits, credits, or transfers between accounts, among other possible transactions. Each transaction of a corresponding financial account may be associated with certain data, such as a corresponding monetary amount and/or date of transaction, by which such transactions may be appropriately categorized or otherwise sorted.

The present invention relates to improved data processing. It is becoming more important as greater quantities of information and personal data is stored in the cloud and/or by the enterprise system 200. For the user 110, improved data management and processing allows for transparency and coordination of the personal data being shared with and used by the enterprise system 200. More and more users 110 are using the mobile device 106 for data management and processing because of case of use, instant access to financial information, and comprehensive understanding of financial status.

In accordance with the present disclosure, data processing is enhanced and improved by predicting transactions and/or outputs of the enterprise system 200. In some embodiments, the predicted transactions may be transactions related to at least one financial account of the user 110 and/or the predicted outputs may be predicted balances of one or more of the financial accounts (e.g., checking account, savings account, credit card account, mortgage account, and the like) of the user 110. By being able to predict the transactions and/or the outputs, the enterprise system 200 provides the user 110 with a more accurate view of his/her dynamic finances. Unlike conventional systems, the enterprise system 200 of the present disclosure includes transactions of the user 110 that have not yet posted to the financial accounts when determining the predicted outputs. As a non-limiting example, the enterprise system 200 predicts, via the computing system 206, a user-specific output by taking a current balance of the financial account of the user 110 and subtracting debit transactions (e.g., transfers out, scheduled bill payments, purchases, etc.) and adding credit transactions (e.g., transfers in, pending deposits, refunds, etc.) that occurred before and/or on the desired date which have not already been included in the current balance. In certain embodiments, the user 110 may be able to select the desired date such as by specifying a number of days or weeks in the future from a current date or indicating a specific calendar date that the user 110 desires to know the predicted user-specific output.

The present disclosure further relates to the creation of a predictive model for predicting the transactions and/or the outputs based on the training of a machine learning program. The machine learning program of the present invention is described hereinafter as utilizing the data sets associated with at least one of the users 110 of the enterprise system 200.

As mentioned hereinabove, each of the users 110 may be a person or entity acting as a customer or client of the enterprise system 200 that utilizes products and/or services from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and each of the users 110 may include one or more of the users 110 having an account with the enterprise system 200 wherein certain interactions between the enterprise system 200 and each of the users 110 may be monitored and recorded by the computing system 206, as described in greater detail herein.

The present invention refers to the use of personal data in executing the corresponding machine learning program. Such personal data may refer to data regarding the responses of one of the users 110 of the enterprise system 200 to one or more corresponding queries, or may collectively refer to the data of a plurality of the users 110 having completed the queries. The user 110 may be alternatively referred to as a respondent of the query when discussing the query process hereinafter. Additionally, as used herein, a query may be any set or sets of queries answered by a respondent for the purpose of collecting data regarding the opinions, feelings, thoughts, beliefs, impressions, predictions, and/or observations of the respondent. The personal data may be accumulated using any known method so long as the personal data is recorded in a form configured for use with the computing system 206 and the corresponding machine learning program executed thereon. In some embodiments, the query may be conducted online via the web browser or software application 132 corresponding to the enterprise system 200 as operating on the user devices, referring to either or both of the computing device 104 and mobile device 106 of the respondent, as desired.

The machine learning program utilizes personal data regarding each of the users 110. As used herein, the personal data of each respective user 110 refers to any data specific to that user 110. The personal data set of each of the users 110 may include the query data set corresponding to that user 110 as a subset of the personal data set thereof, and may include entries relating to each financial account of the user 110 resulting from the completion of the query. The personal data of each of the users 110 of the enterprise system 200 may be in the form of the data 234 stored to the storage device 224 of the computing system 206 at utilized for carrying out the functions of the machine learning program as described herein. The data 234 may originate from various different sources including the responses of the user 110 to queries from the enterprise system 200, the recorded interactions of the user 110 with the enterprise system 200, or one or more third-party and external sources or systems, which may once again be representative of the previously disclosed external systems 202, 204.

The present invention relies upon the enterprise system 200 having access to the personal data associated with each associated user 110 in order to train the machine learning program and subsequently utilize the predictive model generated thereby. In some embodiments, the invention may be carried out with respect to a user 110 having an established account with the enterprise system 200, wherein the establishment of an account may include the user 110 providing at least some of the associated personal data to the enterprise system 200. The enterprise system 200 may collect data regarding the user 110 by directly querying and recording the responses of the user 110. Such data may be entered via use of the web browser application or software application 132 associated with the enterprise system 200, and such information may be entered by the user 110 via use of the user devices, referring to either or both of the computing device 104 and mobile device 106 executing the application 132. The data provided to the enterprise system 200 regarding the user 110 may include, as non-limiting examples, the gender, age, ethnicity, income level, employment status, home ownership status, marital status, citizenship status, etc. of the corresponding user 110. Any available demographic data regarding the user 110 may form a portion of the personal data utilized by the machine learning program with respect the user 110.

The personal data may include sensitive data and domain specific data. Herein, the personal data may refer to data that may be utilized for determining identity of the user 110. Examples of the personal data in case of the data privacy application 232 may include permanent account numbers, date of birth, e-mail address, residential address, and mobile numbers, for example. The personal data may also include data that can pose a risk or affect the user 110 financially or otherwise, if disclosed in public. In an embodiment, the personal data may include domain specific fields, and can be generated by the enterprise system 200.

If the enterprise system 200 is representative of a financial institution or mobile banking system, the personal data accessible to the enterprise system 200 regarding the user 100 may include data relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user devices, referring to either or both of the computing device 104 and mobile device 106 of the user 110.

In some circumstances, such as when the enterprise system 200 is representative of a financial institution or mobile banking system offering typical banking services and products, the enterprise system 200 may have access to data regarding the transactions of the user 110 as facilitated by the enterprise system 200. For example, transaction histories regarding purchases carried out via a credit card or debit card associated with the enterprise system 200 may be accessible to the enterprise system 200, as well as current or prior account balances.

The enterprise system 200 may also be configured to monitor and record specific interactions of the user 110 with the enterprise system 200 in attaining additional data regarding the user 110 that may be utilized by the machine learning program disclosed herein. For example, in the event that the user 110 has an account with the enterprise system 200, the user 110 may be required to provide authentication data to the web browser application or software application 132 associated with the enterprise system 200. Following such a login process, the enterprise system 200 may monitor and record the interactions of the identified user 110 with the interface of the corresponding application 132 in order to accumulate data associated with the user 110. For example, the enterprise system 200 may monitor data such as the number of logins to the account of the user 110 in a specified period of time, the frequency of the logins of the user 110, the duration of time the user 110 remains logged into the application 132 (while remaining active), and the types of interactions with the user 110 via navigation of the corresponding application 132. Data may also be recorded regarding the navigation of the application 132, such as recording which resources the user 110 has accessed, how long such resources were accessed, or the like, such as referencing which web addresses associated with the application 132 have been accessed by the user 110 or which files related to the application 132 have been accessed by the user 110.

The personal data regarding the user 110 may also include data relating to the account settings of the user 110 as established with respect to the computing system 206. Such account setting data may be stored to the storage device 224 of the computing system 206 and may be associated with determining how the computing system 206 interacts with the user 110 via the corresponding user devices, referring to either or both of the computing device 104 and mobile device 106. For example, such account setting data may include data relating to scheduled payments from the accounts of the user 110, personal data requests from the user 110, and the frequency of credits to and debits from the accounts. The change in the account setting may also correspond to a change in the manner in which the user 110 interacts with the computing system 206 via the user devices, referring to either or both of the computing device 104 and mobile device 106, such as changing the time for which the enterprise system 200 predicts the transactions and/or the outputs and/or how the interface of the web browser application or software application 132 displays information to the user 110 or the information or resources accessible to the user 110 via navigation of the web browser application or software application 132, as non-limiting examples.

In other circumstances, the personal data may be representative of data acquired regarding the user 110 during web related activities, such as tracking a web browsing history of the user 110, as may be provided by "cookies" or similar tools, or tracking certain communications of the user 110, such as monitoring certain aspects of the email activity of the user 110. If web related activities are monitored, such data may correspond to the activities of the user 110 with respect to the webpage or software application 132 associated with the enterprise system 200 or may relate to the activities of the user 110 with respect to third-party applications or websites. Such data may be communicated from a corresponding user devices, referring to either or both of the computing device 104 and mobile device 106 used to perform the web browsing to the computing system 206 for storage to the storage device 224 as a form of the data 234.

The enterprise system 200 may also utilize data originating from one of the external systems 202, 204, which may be representative of personal data accumulated with respect to the user 110 external to the enterprise system 200 that is available to or otherwise accessible by the computing system 206 via interaction with one or more of the external systems 202, 204. The external systems 202, 204 may accordingly be representative of third-party data providers configured to communicate data to the computing system 206 regarding the user 110. Such data may include a credit history of the user 110, transactions of the user 110 with respect to other business entities, a criminal history of the user 110, etc., as may originate from sources others than the enterprise system 200. Further examples include data originating from third-party social networks or the like, such as check-ins at certain establishments, social connections to other users, posting or commenting histories, or interactions with certain other users or business entities. Data regarding a transaction history of the user 110, whether derived from the relationship between the user 110 and the enterprise system 200 or the user 110 and a third-party external system 202, 204, may include data regarding the establishments at which the user 110 has made the purchases, the amounts of such purchases, and potentially additional information regarding the products and/or services related to such purchases. Such data may be available via records of the credit or debit purchases made by the user with respect to certain establishments as monitored by the third-party external system 202, 204.

The personal data collected with respect to each user 110 may be categorized as demographic data regarding the user 110, behavioral data regarding the activities of the user 110, or behavioral data regarding the activities of the enterprise system 200 with respect to the user 110. The demographic data generally refers to the data regarding the user 110 that corresponds to a trait or characteristic of the user 110 by which the user 110 may be categorized or classified, whereas the behavioral data generally refers to data regarding the recordation of information regarding the actions of the user 110, the actions of the enterprise system 200, or past interactions or transactions occurring between the enterprise system 200 and the user 110.

A personal data set associated with any individual user 110 may include entries of any the different types of data disclosed hereinabove, including entries relating to demographic data or behavioral data. Each entry of the personal data set may be representative of one of the demographic traits of the user 110 or one of the behavioral traits of the user 110. The number or types of entries available in each personal data set may vary among users 110 depending on the relationship to the enterprise system 200 and the availability of such data.

The data set comprising the personal data sets of each of the plurality of the users 110 of the enterprise system 200 may collectively be referred to as the training data set associated with the machine learning program. The training data set may be organized based on the methodology of the machine learning program utilized in finding relationships between the personal data, the transactions and/or the outputs.

In one embodiment of the present invention, the machine learning program is configured to perform unsupervised learning where the training data set formed by the personal data of the users 110 is unlabeled with respect to all entries. As such, neither the query data nor the remaining personal data is representative of a form of known output data during the process of training the machine learning program. Each of the different data entries regarding a specific user 110, whether query data entries or otherwise personal data entries associated with the user 110, may therefore form an independent unlabeled input for performing the unsupervised learning of the machine learning program.

The personal data entries associated with each user 110 and included in the corresponding personal data set may include any combination of the classifications or categorizations of the personal data described hereinabove while remaining within the scope of the present invention. For example, in some circumstances, the training data may include the demographic personal data of one or more of the users 110. In other circumstances, the training data may include the behavioral data regarding the activities of one or more of the users 110. In other circumstances, the training data may include the behavioral data regarding the activities of the enterprise system 200 with regards to one or more of the users 110. In other circumstances, the training data includes a combination of the listed types of data, such as demographic data and one or both of the identified forms of behavioral data regarding one or more of the users 110.

As used hereinafter, all personal data of each user 110 that is utilized in training the machine learning program or performing a prediction via the predictive model generated by the machine learning program may alternatively be referred to as the personal data profile of the corresponding user 110 at the time at which such data is utilized by the machine learning program. For example, one specific user 110 may include a personal data profile including a combination of query data, demographic data regarding the specific user 110 (age, income, marital status, etc.), and data regarding recorded interactions the specific user 110 has engaged in with the enterprise system 200 (account transaction history, application browsing history, etc.). The personal data profile of the user 110 accordingly is different each time the personal data regarding the user 110 as utilized by the machine learning program changes, such as when certain entries indicate a change in value or a change in state or condition with respect to the personal data set of the user 110.

The machine learning program may be configured to perform cluster analysis wherein the training data constituting the personal data is grouped into subsets (clusters) wherein each cluster is determined by the similarity of the data contained within the cluster with respect to a plurality of the users 110, or the dissimilarity with respect to data not within the cluster with respect to the plurality of the users 110, depending on the methodology utilized. That is, each cluster includes a plurality of the users 110 identified as forming the cluster having met a threshold degree of similarity among the data corresponding to the plurality of the users 110 according to a predefined similarity criteria. This clustering allows for users 110 having a similarity of personal data profile, such as a certain set of demographic traits and behavioral traits based on the corresponding data, to be grouped together along with certain transactions and/or outputs typical of this cluster of the users 110. For example, a cluster of users 110 corresponding to a certain personal data profile (or aspects thereof) may also correspond to those same users 110 having a common or similar transactions and/or outputs, or alternatively this cluster may include each of the users 110 having a common or similar transactions and/or outputs. The unsupervised learning process accordingly allows causality to be implied between a particular personal data profile and a particular result by discovering a correlation between such common occurrences of these data within the training data.

The machine learning program may be considered to be a form of classification algorithm based on the ability of the machine learning program to identify classifications of the users 110 associated with the training data set based on the clusters of the users 110 discovered within the training data. The machine learning program may utilize a hidden Markov model in modeling the training data set and forming the predictive model of the machine learning program. The machine learning program may also utilize non-negative matric factorization in performing the above described clustering analysis.

The machine learning program may be configured to determine a probability that a certain personal data profile will correspond to certain transactions and/or certain outputs. The machine learning program may utilize various forms of fuzzy logic to represent the probability of any given result occurring in the query data when performing the calculations relating to such predictions.

The unsupervised training of the machine learning program includes repeatedly adding new data to the training data set regarding new and additional users 110, for example, having added transactions and/or outputs and/or made personal data requests to the enterprise system 200 or externally with one or more third-party entities. As more data regarding more users 110 are added to the training data set, additional relationships may be discovered within the structure of the data or refinements may be made with respect to already discovered relationships, thereby improving the predictive capabilities of the machine learning program. The training of the machine learning program results in the generation of a predictive model wherein the machine learning program is configured to predict transactions and/or outputs expected to be associated with a personal data profile of a specific user 110.

The machine learning program may be configured to make predictions (determinations) regarding the transactions and/or outputs when the determined probability of transactions and/or outputs occurring as predicted by the predictive model exceeds a threshold value of probability. For example, the machine learning program may only make a definitive determination with respect to the transactions and/or the outputs when the probability of the prediction being correct exceeds 50%. The machine learning program may alternatively be configured to make predictions regarding the transactions and/or the outputs when the determined probability for a certain result exceeds the probability of all other possible results with respect to the transactions and/or the outputs. For example, where the transactions and/or the outputs are concerned, the selection showing the greatest probability of being correctly predicted may be utilized as the prediction of the predictive model, even where this event is not more likely than not to occur.

Once the machine learning program has been trained to a degree considered suitable for predicting the transactions and/or the outputs associated with the personal data, the machine learning program may be configured to compute and communicate data regarding the predictions of the machine learning program in view of a specific personal data profile, which corresponds to the personal data profile of a specific user 110 of the enterprise system 200. Such a prediction occurs in the absence of an action regarding the transactions and/or outputs by the specific user 110. Instead, the machine learning program utilizes only the personal data profile of the corresponding user 110 for determining a correlation with an expected transactions and/or outputs. The machine learning program is accordingly able to predict (to some degree of probability) the expected transactions and/or the outputs via the exclusive use of the personal data profile of the user 110 when executing the predictive capabilities of the machine learning program.

The data derived from the predictions of the machine learning program are hereinafter referred to as prediction data, and may refer to the data regarding the predictions of the transactions and/or the outputs of the user 110 to the enterprise system 200 and/or one or more third-party entities. Such prediction data may be stored as the data 234 of the computing system 206 for use by the enterprise system 200 in making further determinations regarding the user 110 as described hereinafter.

The predictive model of the machine learning program may be configured to predict user-specific transactions and/or user-specific output with respect to a corresponding user 110. Assuming that the methodology of the algorithm is known by the computing system 206 regarding the determination of actual transactions and/or outputs of the user 110 may accordingly be determined by predicting the user-specific transactions and/or the user-specific outputs of the user 110 according to the corresponding algorithm. Each such predicted transactions and/or outputs may be assigned a numeric score or may be determined to trigger a condition of the algorithm logic in accordance with the same known methodology utilized within the algorithm.

By assigning the same values and/or rules to the predicted transactions and/or outputs as those applied to the actual transactions and/or outputs of the user 110, the enterprise system 200 can utilize the same methodology via the corresponding algorithm in computing a numeric score associated with the corresponding subset of the personal data. That is, the use of the same methodology in computing the score based on the predicted transactions and/or outputs as the methodology used in computing the score based on the actual user-specific transactions and/or user-specific outputs of the user 110 results in the same score being generated with respect to either process when the machine learning program correctly predicts the user-specific transactions and/or user-specific outputs of the user 110. The calculation of such a score may include the use of the prediction data generated by the machine learning program with respect to a specific user 110 as the input data for use in the algorithm, which may be stored as instructions 226 within the storage device 224 of the computing system 206, and which may be executed by the processor 220 thereof. The resulting score and transactions and/or outputs may then be stored as a form of the data 234.

In alternative embodiments, the machine learning program may instead associate the personal data profile of each of the users 110 directly to the transactions and/or outputs determined by the algorithm in the absence of an independent determination of the transactions and/or outputs by the computing system 206 based on the input to the algorithm. The prediction of individual user-specific transactions and/or user-specific outputs is thus not required for then computing such transactions and/or outputs. Instead, the transactions and/or outputs may be predicted via a correlation between the personal data profile of the instantaneous user 110 and the personal data profiles associated with such transactions and/or outputs as determined during the unsupervised training of the machine learning program described above. In other words, the personal data profile of the user 110 may be determined to belong to a cluster of data regarding users 110 having specific transactions and/or outputs, hence the transactions and/or outputs would be predicted to be the transactions and/or outputs of the corresponding user 110 absent analysis of data regarding individual user-specific transactions and/or user-specific outputs. The actual transactions and/or outputs may then be initiated based upon the predicted transactions and/or outputs of the corresponding user 110.

Figure 7:
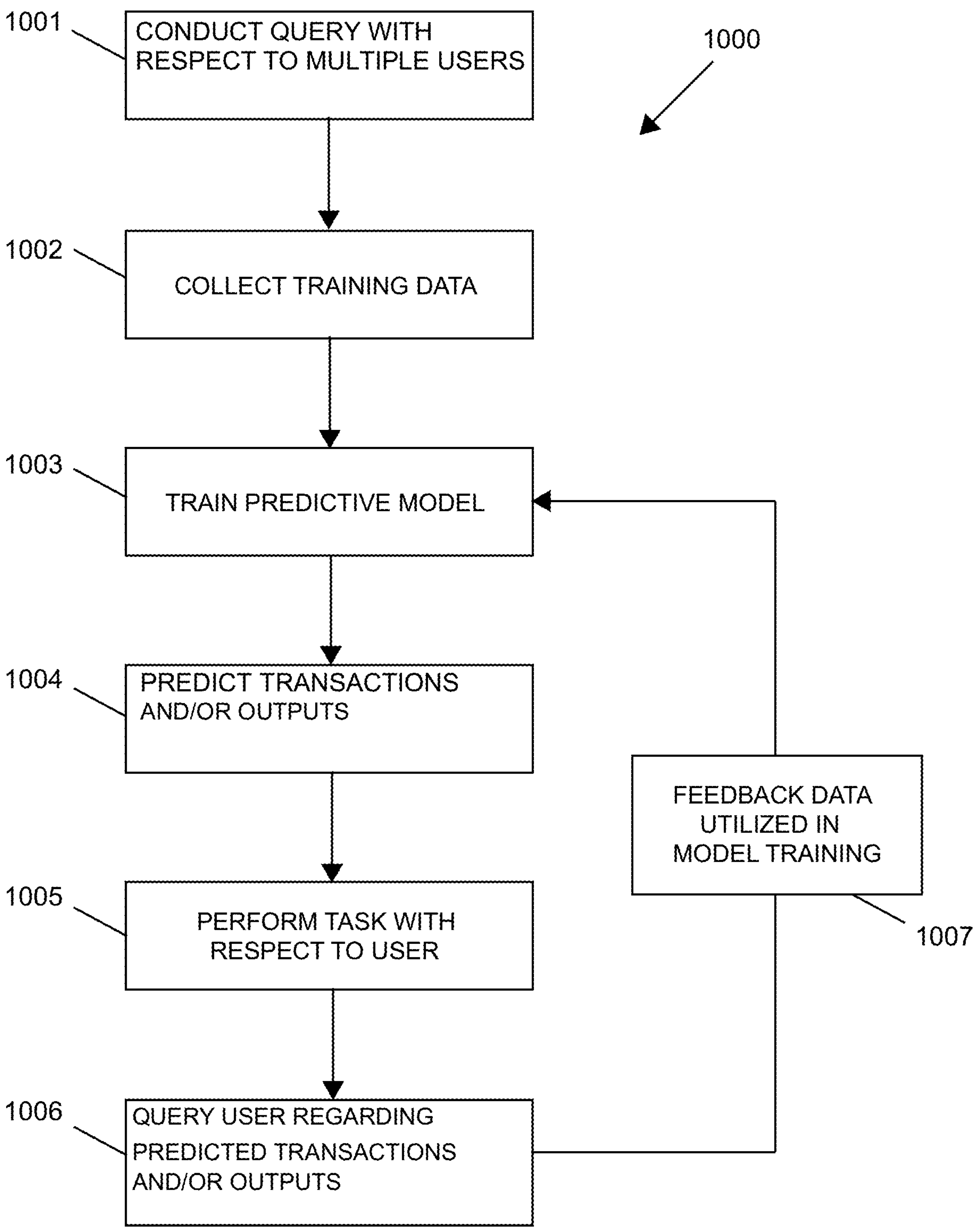
FIG. 7 is a flow diagram of an exemplary method utilizing machine learning for predicting one or more transactions and/or outputs according to the invention.

FIG. 7 illustrates a method 1000 of implementing the machine learning program for predicting the transactions and/or outputs with respect to a user 110 of the enterprise system 200 based on the personal data profile of the user 110 according to the present invention. The method includes an initial step 1001 of conducting the queries with respect to a plurality of the users 110 to establish the personal data utilized in the training data set. As mentioned above, the queries may be conducted directly by the enterprise system 200 or by a third-party external source 202, 204, and may be initiated at the request of the user 110, the enterprise system 200, or the third-party external source 202, 204.

In some embodiments, the enterprise system 200 requests the completion of the query by the user 110 when the user 110 first establishes a relationship with the enterprise system 200, such as when the user 110 first establishes an account with the enterprise system 200. The use of data related to new users 110 of the enterprise system 200 aids in establishing a benchmark for monitoring the progress of these new users 110 as they continue to have a relationship with the enterprise system 200. In other embodiments, the enterprise system 200 allows for users 110 already having an established relationship with the enterprise system 200 to complete the query. The use of data of existing customers or clients of the enterprise system 200 allows the training data set to include data regarding the past behaviors of either of the user 110 or the enterprise system 200, or the interactions therebetween, as outlined hereinabove when describing the possible forms of personal data that may be utilized by the machine learning program. In other embodiments, the training data set includes the data of both new and existing customers or clients of the enterprise system 200, with the personal data set of the different users 110 varying in scope.

A step 1002 includes the collection of the training data required for performing the training of the machine learning program as described hereinabove. The collection of the training data includes the collection of the personal data including the corresponding personal data regarding each user 110 having completed the query. As described hereinabove, such data may originate from any of the described sources 110, 200, 202, 204 and may be communicated to the computing system 206 of the enterprise system 200 using any of the methods or communication channels described hereinabove. Certain proprietary data are also collected directly by the enterprise system 200 as a result of the monitoring of the interactions of the enterprise system 200 and the user 110 as described hereinabove.

A step 1003 includes training the machine learning program utilizing the applicable training data to generate a predictive model having the capabilities described hereinabove. The predictive model may be acquired utilizing any of the machine learning processes described herein without necessarily departing from the scope of the present invention. In the present example, it is assumed that the training of the machine learning program at step 1003 includes the use of unsupervised learning with the personal data and the query data forming the training data being considered to be unlabeled, which aids in discovering counterintuitive or unexpected relationships between the personal data and the query data.

A step 1004 includes predicting the transactions and/or outputs with respect to an individual user 110 using the predictive model of the machine learning program as based on the personal data profile of the user 110 at the time of the prediction. The predicting step includes the machine learning program correlating the data profile of the individual user 110 to each of the prescribed elements of the query data, such as the responses to individual queries. The predicting step results in the generation of the prediction data regarding the individual user 110, which may be stored to the storage device 224 of the computing system 206 as a form of the data 234.

A step 1005 includes the computing system 206 of the enterprise system 200 optionally causing an action to take place in reaction to the generation of the prediction data with respect to the user 110. Such actions may relate to a communication being sent to the corresponding user 110 or a change in the behavior of the computing system 206 to reflect the contents of the prediction data. These tasks are elaborated on in greater detail hereinafter.

The machine learning program has been described thus far as utilizing unsupervised learning, but the machine learning program may also be configured to utilize semi-supervised learning in an attempt to create a feedback mechanism for testing the validity of the predictions made by the machine learning program with respect to a specific user 110, and to thereby refine the predictive model of the machine learning program. Specifically, following the above described step 1004 of predicting the user-specific transactions and/or user-specific outputs with respect to a specific user 110, such prediction data may be evaluated for accuracy by performing a step 1006 of querying the specific user 110 for which the predictions were made regarding the agreement or disagreement of the specific user 110 with the predictions made by the predictive model.

The querying of the specific user 110 may include presenting the user 110 with a request for an impression of the user 110 mirroring that of one of the transactions and/or outputs. The querying of the specific user 110 may therefore include the use of language and/or numerical values that is the same or similar to that utilized in the corresponding user-specific transactions and/or user-specific outputs, or that otherwise communicates the request for the same information. For example, the prediction data generated with respect to the specific user 110 may indicate that the specific user 110 is predicted to have a transaction being a debit of a certain amount on a specific date and/or an output being a balance of a financial account of a certain amount. The querying may accordingly include the enterprise system 200 initiating a request that the specific user 110 confirm or deny such transaction and/or output. The querying step 1006 may, in some circumstances, comprise the specific user 110 completing the entirety of the query to evaluate each and every aspect of the prediction data regarding the user 110, as desired. The querying step 1006 may also only occur with respect to a subset of the users 110 having completed transactions and/or outputs.

The querying step 1006 may occur via any form of communication occurring between the user devices, referring to either or both of the computing device 104 and mobile device 106 of the user 110 and the computing system 206 of the enterprise system 200. In some embodiments, the user 110 is notified of the querying request and responds to the querying request during navigation of the web browser application or software application 132 associated with the enterprise system 200. The data relating to the responses of the user 110 to such feedback queries is referred to hereinafter as the feedback data associated with the specific user 110 who has been queried. The feedback data forms a feedback data set with respect to each respondent user 110 that may be stored to the storage device 224 as a form of the data 234.

The previously mentioned semi-supervised learning may occur via the use of the feedback data as labeled output data with respect to the training data set. That is, the training data set may now include a combination of the personal data associated with users 110, the personal data associated with user 110 having completed the transactions and/or outputs, the personal data associated with the users 110 who responded to a feedback related query following predictions regarding those users 110, and the feedback data associated with those users 110 who responded to the feedback related query to evaluate the prediction data. All such data may be unlabeled with the exception of the described feedback data. The semi-supervised training of the machine learning program via the introduction of the feedback data into the training data set is represented by step 1007 in FIG. 7, which schematically illustrates the manner in which the feedback data is utilized as a part of the training data set during the training step 1003. The newly trained machine learning program may include a modified predictive model, which is then able to perform the predicting step 1004 in accordance with the methodology of this modified predictive model. The generation of the modified and updated predictive model is further described with reference to the description of the method of FIG. 6, which describes such a process generally. It should also be appreciated that any of the processes described in the explanation of FIG. 6 may be utilized in training and building the predictive model as described herein.

It should be appreciated that the machine learning program may operate in the absence of the semi-supervised learning as relating to steps 1006, 1007, and may instead rely exclusively on the predictive model generated during the unsupervised learning processes described herein without necessarily departing from the scope of the present invention.

The machine learning program has been described thus far as utilizing unsupervised or semi-supervised learning, but the machine learning program may alternatively utilize supervised learning wherein the training data is labeled appropriately for establishing a causal relationship between the input training data in the form of the personal data of each user and the output training data in the form of the query data accumulated with respect to that same user 110. The supervised training process of the machine learning program may utilize any of the supervised training processes disclosed herein, including the use of a neural network having at least one hidden layer, without departing from the scope of the present invention.

A variety of different triggering conditions may be utilized by the enterprise system 200 in determining when the machine learning program should execute the predictive aspects of the machine learning program to make a determination of the prediction data with regards to a specific user 110 with respect to step 1004. In some embodiments, the prediction data may be determined with respect to a specific user 110 when such transactions and/or outputs are requested by the user 110 or manually requested by an agent 210 of the enterprise system 200. For example, the option to have such prediction data generated by the enterprise system 200 may be offered by the enterprise system 200 via the corresponding web browser application or software application 132 associated with the enterprise system 200, wherein a selection of such a feature by the user 110 causes the computing system 206 to initiate the generation of the corresponding prediction data via the execution of the predictive modeling of the machine learning program. Alternatively, the agent 210 may offer the determination of the prediction data when the agent 210 believes that such transactions and/or outputs may be helpful to the user 110.

In other embodiments, the prediction data may be determined at fixed intervals, or otherwise on a fixed schedule. For example, the prediction data may be determined with respect to each participating user 110 at regular intervals, such as daily, weekly, monthly, or quarterly, or may be preprogrammed to occur on specific dates as requested by the user 110 or agent 210, as non-limiting examples.

In other embodiments, the prediction data may be determined when the personal data profile of the specific user 110, as available for use in training the machine learning program and executing any predictive capabilities thereof, indicates that a triggering condition has occurred that may be indicative of the need for an assessment of the user 110, such as the occurrence of an event shown to have a strong correlation to a change in transactions and/or outputs of the user 110 regarding the predictions relating to the user 110. For example, the personal data of the user 110 reflecting that the user 110 has reached a certain threshold of a balance in a financial account may prompt the determination of the prediction data when such account balance is demonstrated to correlate to a change in the predictive transactions and/or outputs of the user 110.

Personal data specific to and accessible exclusively by the enterprise system 200 may be utilized in determining such a triggering condition. Such personal data may be acquired as a result of the relationship present between the enterprise system 200 and the user 110. For example, if the enterprise system 200 is a financial institution having access to account records, the triggering condition may relate to a certain balance being reached within one of the accounts of the user 110, or to a failure of the user 110 to make a scheduled payment on a debt managed by the enterprise system 200. Such personal data may accordingly refer specifically to interactions between the user 110 and the enterprise system 200 as a part of the relationship present between the user 110 and the enterprise system 200, including data regarding past transactions of the user 110 as initiated by the enterprise system 200 or transactions occurring directly between the user 110 and the enterprise system 200. For example, the enterprise system 200 may utilize data regarding purchases of the user 110 made with entities other than the enterprise system 200 (where such data is available, such as where a financial instrument such as a credit card or debit card associated with the enterprise system 200 is used in making these purchases) or data regarding transactions including payments, agreements, or other contractual obligations made directly between the user 110 and the enterprise system 200.

Such data may also include data collected by the enterprise system 200 from a third-party source where the user 110 has provided express consent for such data to be shared with or otherwise accessible to the enterprise system 200, such as data regarding transactions occurring between the user 110 and entities external to the enterprise system 200 that are not otherwise monitored directly by the enterprise system 200. For example, the enterprise system 200 may have access to data regarding transactions occurring with respect to a credit card or debit card of the user 110 associated with and/or managed by a financial institution other than the enterprise system 200, hence such data must be communicated to the enterprise system 200 for access thereto.

The enterprise system 200 may also utilize personal data collected with respect to the user 110 regarding the interactions of the user 110 with the enterprise system 200 via the corresponding web browser application or software application 132 associated with the enterprise system 200. For example, the navigating of the application 132 may include the user 110 reviewing information relating to certain financial accounts, or making a selection that additional information is requested with respect to a topic related to one of the transactions and/or outputs corresponding to the prediction data. Similar data may be collected regarding alternative interactions, such as whether or not the specific user 110 views or responds to email messages, text messages, or the like, as applicable. The determination of the prediction data based on such interactions may aid in proactively assessing the user 110 and offering intervention by the enterprise system 200, such as allowing the enterprise system 200 to offer certain products and/or services when it has been determined that such products and/or services have been reviewed by the user 110 in conjunction with the data profile of the user 110, thereby indicating a need of the user 110 to attain such a product and/or service.

The triggering conditions indicated above may also be complex in nature and may include reference to multiple different variables of the personal data of the user 110 or multiple conditional relationships therebetween. As one example, upon determining that a balance of a financial account of the user 110 has surpassed a certain threshold, an additional variable of the personal data of the user 110, such as an age of the user 110 accessible to the enterprise system 200, may be utilized in determining whether the prediction data must be determined and further utilized. Specifically, with respect to the given example, the triggering of the determination of the prediction data may include the determination being made only if a balance of one or more of the financial accounts of the user 110 meets or exceeds an established threshold and the data regarding an age of the user 110 also meets or exceeds the established threshold. It should also be appreciated that the prediction data may be collected based on any combination of any of the above described conditions or events, as desired.

In some embodiments, the computing system 206 of the enterprise system 200 may continuously and automatically determine the prediction data with respect to each participating user 110 whenever the personal data set (profile) of the corresponding user 110, which may include the data regarding the user 110 that has been utilized in training the machine learning program, is indicated as having changed from a previous instance as monitored by the computing system 206. Such a change in data may refer to any of the data entries utilized by the predictive model in making a determination of any prediction data having a changed state, value, or condition. Such a change may include a changed condition of the corresponding user 110 or the initial receipt of previously unknown or undetermined information. The data that is determined to have changed may be derived from an interaction between the user 110 and the enterprise system 200 or may be acquired by the enterprise system 200 from a third-party source 202, 204. This allows the prediction data corresponding to any one user 110 to always be as up to date as possible.

With renewed reference to step 1005 of FIG. 7, the enterprise system 200 may utilize the prediction data determined with respect to each of the participating users 110 for performing a variety of different tasks once such prediction data has been determined. In some circumstances, the prediction data is communicated or otherwise reported directly to the corresponding user 110 for review by the user 110, such as a review of the predicted transactions and/or outputs. In other circumstances, the prediction data is utilized by the enterprise system 200 to make determinations regarding further interactions with the user 110, initiating, continuing, and/or changing predicted user-specific transactions and/or user-specific outputs, changes in settings and/or behavior of the enterprise system 200, and changes in settings and/or behavior of one of more third-party entities.

The prediction data may be communicated to the user 110 using a number of different methods while remaining within the scope of the present invention. In some embodiments, each determination of the prediction data with respect to one of the users 110 causes the computing system 206 to associate such data with the account of the corresponding user 110, as may be associated with the web browser application or software application 132. Such prediction data may then be accessible whenever the user 110 gains access to the account of the user 110, such as may occur via browsing of the web browser application or software application 132. If such determinations are made continuously or automatically each time new or changed personal data is acquired or determined by the computing system 206 with respect to a corresponding user 110, the user 110 is able to access an up to date and semi-real time transactions and/or user-specific outputs of the user 110 via access to the web browser application or software application 132. The prediction data communicated to the user 110 may include any predictions regarding user-specific transactions and/or user-specific outputs related to the personal data of the corresponding user 110 for the enterprise system 200 and/or the third-party entities.

The prediction data may alternatively be proactively sent to the corresponding user 110 by the enterprise system 200 using any known communication method. For example, an email, text message, push notification, a quick response (QR) code, or the like may be generated by the computing system 206 for communication to the corresponding user 110. Such a communication may be communicated from the computing system 206 to the user devices, referring to either or both of the computing device 104 and mobile device 106 of the user 110 using any of the methods described hereinabove in describing the communication capabilities of the devices 104, 106 and systems 200, 206 within FIG. 1. The user 110 may then review such prediction data regarding the corresponding user 110 via interaction with the corresponding user devices, referring to either or both of the computing device 104 and mobile device 106, which provides a perceptible expression of the prediction data. Such a perceptible expression of the prediction data may include the data being visually perceptible, such as in the form of readable text able to be displayed on the user devices, referring to either or both of the computing device 104 and mobile device 106, or audibly perceptible, such as in the form of an audio file able to be played by the user devices, referring to either or both of the computing device 104 and mobile device 106. The display 140, particularly the GUI, of the user device 106 or the speaker 144 of the user device 106 may be utilized in perceiving the prediction data.

In summary, the determination of the prediction data may cause the enterprise system 200 to passively or actively communicate the prediction data to the corresponding user 110. The prediction data may be data 234 communicated from the storage device 224 of the computing system 206 for receipt by the user devices, referring to either or both of the computing device 104 and mobile device 106 of the user 110 using known data communication methods and protocols as established and described with reference to FIG. 1. The user 110 then accesses the prediction data, which may be presented visually in the form of text as displayed on the GUI of the user device 106 or may be audibly played for the user 110 via use of the speaker 144 of the user device 106. The prediction data accordingly is a form of transferrable results of the machine learning program that can be communicated to the user 110 via a transfer of such prediction data (or a representation thereof) from the computing system 206 of the enterprise system 200 to the user devices, referring to either or both of the computing device 104 and mobile device 106 of the corresponding user 110.

The enterprise system 200 may determine to utilize the prediction data for performing a specific task at step 1005 depending on a variety of different factors, including the use of several triggering conditions in similar fashion to the description of when a determination of the prediction data is to be determined with respect to a user 110 as described hereinabove with respect to step 1004. Such conditions are briefly discussed hereinafter.

In some circumstances, the computing system 206 may determine that the prediction data is to be communicated to a corresponding user 110 when the personal data of the user 110 accessible to the enterprise system 200 indicates that a triggering condition has occurred. Such a communication of the prediction data following the triggering condition may occur using any of the methods described above. The triggering condition may utilize or refer to the personal data of the user 110 that is widely or publicly available, the personal data of the user 110 that is specifically accessible by the enterprise system 200 via the relationship present between the user 110 and the enterprise system 200 (such as the data regarding the account history of the user 110 with the enterprise system 200 or those recorded interactions of the user 110 with the application 330 associated with the enterprise system 200), or the personal data of the user 110 that is acquired by the enterprise system 200 from an approved third-party source. The triggering condition may include multiple conditions being met prior to the triggering condition being met, such as any combination of different thresholds of any combination of variables being met in similar fashion to the examples provided above with regards to when the machine learning model creates such prediction data.

In other circumstances, the computing system 206 may determine that the prediction data is to be communicated to the corresponding user 110 when the prediction data itself indicates that a triggering condition has occurred requiring the communication of such prediction data to the user 110. For example, if the prediction data includes an output being a balance of a financial account below a minimum threshold. Specifically, the triggering event may include any one of the user-specific transactions and/or user-specific outputs indicating a need for the communication of the prediction data to the specific user 110 based on the specified criteria of the enterprise system 200, or any combination of such conditions.

The computing system 206 may also be configured to record each instance of the determination of the prediction data with respect to each user 110, wherein such past determinations are referred to hereinafter as the historical prediction data regarding the user 110. Such historical prediction data may be utilized in creating a triggering condition for initiating the communication of the current prediction data to the user 110. Such a triggering condition may occur when a threshold change has been determined as occurring between the historical prediction data and the current prediction data. Such a change may refer to a modification to the user-specific transactions and/or user-specific outputs with respect to previous determination of the prediction data, whether such change is positive or negative, or an increase or decrease.

With respect to individual user-specific transactions and/or user-specific outputs, a triggering condition may refer to a predicted transactions and/or outputs corresponding to an action of the user 110 that is different from a previous iteration of such predicted transactions and/or outputs, such as an opposite action being taken with respect to possible transactions and/or outputs of the user 110. For example, the user 110 transferring funds from the financial account on a specific date of the month or a lack of an automated deposit thereto on a specific date of the month, which then is not in alignment with or is in opposition to the previous transactions of transferring or depositing funds into the financial account, may be indicative of such a triggering condition being met.

Additionally, if a feedback mechanism is utilized for confirming the prediction data against the current transactions and/or outputs of the user 110 according to the described semi-supervised training process of step 1007, the feedback data regarding the responses of the user 110 to the queries of the transactions and/or outputs may also be utilized as a basis for comparison to the newly determined prediction data. That is, any feedback given by the user 110 regarding a difference in any query of the transactions and/or outputs may be utilized for comparison to any subsequently determined prediction data regarding that user 110.

In some embodiments, the aforementioned reporting of the prediction data may further include the reporting of the historical prediction data regarding the corresponding user 110 in addition to the instantaneous prediction data based on the instantaneous personal data profile of the corresponding user 110. That is, the previously described reporting of the prediction data via the web browser or software application 132 or via the use of a communication sent to the user devices, referring to either or both of the computing device 104 and mobile device 106, may include the reporting of a plurality of the past iterations of the prediction data forming the historical prediction data, such as a record of each subsequent generation of the prediction data. Such past data, such as past predicted transactions and/or outputs based on past personal data profiles of the corresponding user 110, may be displayed in list form or may be displayed graphically, as non-limiting examples.

Each instance of the generation of the prediction data, such as each instance of the generation of the predicted transactions and/or outputs for the corresponding user 110, may also be displayed in accordance with information relating to the change in the personal data set of the corresponding user 110 leading to the newly predicted data. For example, if the predicted transactions and/or outputs of the corresponding user 110 changes following a change in the personal data set of the corresponding user 110, such as may be indicated by the purchase of a specific product and/or service or the change of a specific account setting, the nature of the change in the personal data set may be included in the reporting of the predicted user-specific transactions and/or user-specific outputs, such as listing the purchase in question or listing the nature of the change in the account setting in a manner relating such an event to the change in the predicted user-specific transactions and/or user-specific outputs.

The reporting of the change in the personal data set causing such a change in the predicted transactions and/or outputs may only occur when a triggering condition is met. For example, the historical prediction data may only include data regarding those changes to the personal data set of the corresponding user 110 causing a change in the predicted user-specific transactions and/or user-specific outputs.

As an example of the above concepts, the user 110 may access the web browser or software application 132 to view the instantaneous predicted user-specific transactions and/or user-specific outputs of the user 110 based on the most up to date personal data set of the user 110 as known by the computing system 206. The user 110 may also view the historical prediction data regarding each of the predicted user-specific transactions and/or user-specific outputs regarding the user 110 that have occurred previously. In the present example, the user 110 may view a plurality of past determinations of the predicted transactions and/or outputs, such as five past iterations of the generation of the transactions and/or outputs based on five different changes in the personal data set of the user 110. The five different predicted transactions and/or outputs may be used to determine a trend or trends occurring with respect to such changes in the personal data set. Each prediction of the transactions and/or outputs may be associated with a time and date, or with a set of conditions associated with the user 110, such as certain entries of the personal data set of the user 110 when the transactions and/or outputs was predicted. As a specific example, each iteration may include the ability to access the personal data set or a representation of the information included therein, such as specific account balances or account settings that the user 110 had at the time of each of the predicted user-specific transactions and/or user-specific outputs. Each successive reported transactions and/or outputs may also include information relating to the change in the personal data set leading to such a change. According to such exemplary iterations, the user 110 can easily determine the activities that are affecting the resulting predicted transactions and/or outputs, and can model future activities on the basis of such information.

With regards to step 1005, the enterprise system 200 may also initiate alternative interactions with the user 110 beyond merely communicating the prediction data such as the transactions and/or outputs to the user 110 in the forms mentioned above. Such alternative interactions may include the enterprise system 200 offering products and/or services to the user 110 in reaction to an analysis of the prediction data specific to the user 110. Such products and/or services may be provided in an attempt to intervene and improve transactions and/or outputs of the user 110 as determined by the prediction data. Such products and/or services may be freely provided or may be offers for sale of said products and/or services by the enterprise system 200. In other circumstances, the enterprise system 200 may discontinue, or offer to discontinue with the permission or approval of the user 110, the availability of certain products and/or services to the user 110 in order to improve a financial status of the user 110 as determined by the prediction data.

The determination to initiate the described alternative interactions may occur in the same manner as that described with regards the determinations to communicate the prediction data to the corresponding user 110 as described above. Specifically, the alternative interactions may be initiated by any of the triggering conditions or combinations thereof described hereinabove as initiating such a communication of the prediction data, or in initiating the generation of the prediction data via use of the predictive model. Such triggering conditions may be specifically related to the transactions and/or outputs as a part of the alternative interaction. For example, the computing system 206 may alternatively alter the account settings of the user 110 in a manner altering a manner in which the computing system 206 interacts with the user 110 via the corresponding user devices, referring to either or both of the computing device 104 and mobile device 106, in response to the generation of the prediction data regarding the user 110. In some instances, such account setting changes may include changing the settings relating to the frequency of communications sent from the computing system 206 to the user 110 for access via the user devices, referring to either or both of the computing device 104 and mobile device 106, under what conditions to communicate with the user 110, the content of such communications, the types or forms of such communications, the manner in which the interface of the web browser application or software application 132 displays information to the user 110, or the information or resources accessible to the user 110 via navigation of the web browser application or software application 132, as non-limiting examples. The changing of the account settings may refer to the computing system 206 altering the account related data stored as a form of the data 234 associated with the storage device 224, which in turn results in a reconfiguring of the operation of the computing system 206 with regards to how the computing system 206 subsequently interacts with the user devices, referring to either or both of the computing device 104 and mobile device 106 with respect to at least one variable.

In some embodiments, the user 110 may execute the user software application 132 using the user device (referring to either or both of the computing device 104 and the mobile device 106). An initial landing page of the application 132 may be provided on the display 140 via the GUI. The user 110 selects, via the GUI, whether to log into the application 132 as an authenticated user or as an unauthenticated user. To proceed when the user 110 is authenticated, the user 110 inputs credentials into the application 132, via the GUI. Various credentials may be required such a username and a password in order to further access the application 132. Alternatively, to proceed when the user 110 is unauthenticated, the user 110 may input personally identifiable information (PII) data (e.g., first name, last name, social security number, telephone number, email, date of birth, address, city, state, zip code, identification document number, and the like), via the GUI, into the application 132. Once the credentials have been verified or the PII data has been inputted, a personal or a generic dashboard, respectively, may be provided via the GUI.

From the dashboard, the user 110 may select, via the GUI, a desired date such as a specific number of days or weeks in the future from a current date or a specific calendar date that the user 110 desires to know the predicted transactions and/or output (e.g., the predicted transactions and/or predicted balance of a financial account of the user 110). The desired date is not a static preference, and can be updated by adding new preferences and/or deleting existing preferences, or replacing preferences with new preferences.

Upon completion of the selection of the desired date, the computing system 206 of the enterprise system 200 predicts the user-specific transactions occurring before and/or on such desired date and/or user-specific output for such desired date. In some embodiments, the computing system 206 predicts the user-specific transactions (e.g., predicted credits and debits), and thereby further predicts the user-specific output (e.g., the predicted balance of the financial account of the user 110) by using the current balance of the financial account and incorporating the predicted user-specific transactions (i.e., increasing or decreasing the current balance by an amount of the predicted user-specific transactions occurring before and/or on the desired date that were not already included in the current balance). The computing system 206 then displays, via the application 132, the predicted transactions and/or the predicted user-specific outputs on the GUI of the at least one user device (referring to either or both of the computing device 104 and the mobile device 106).

Figure 8:
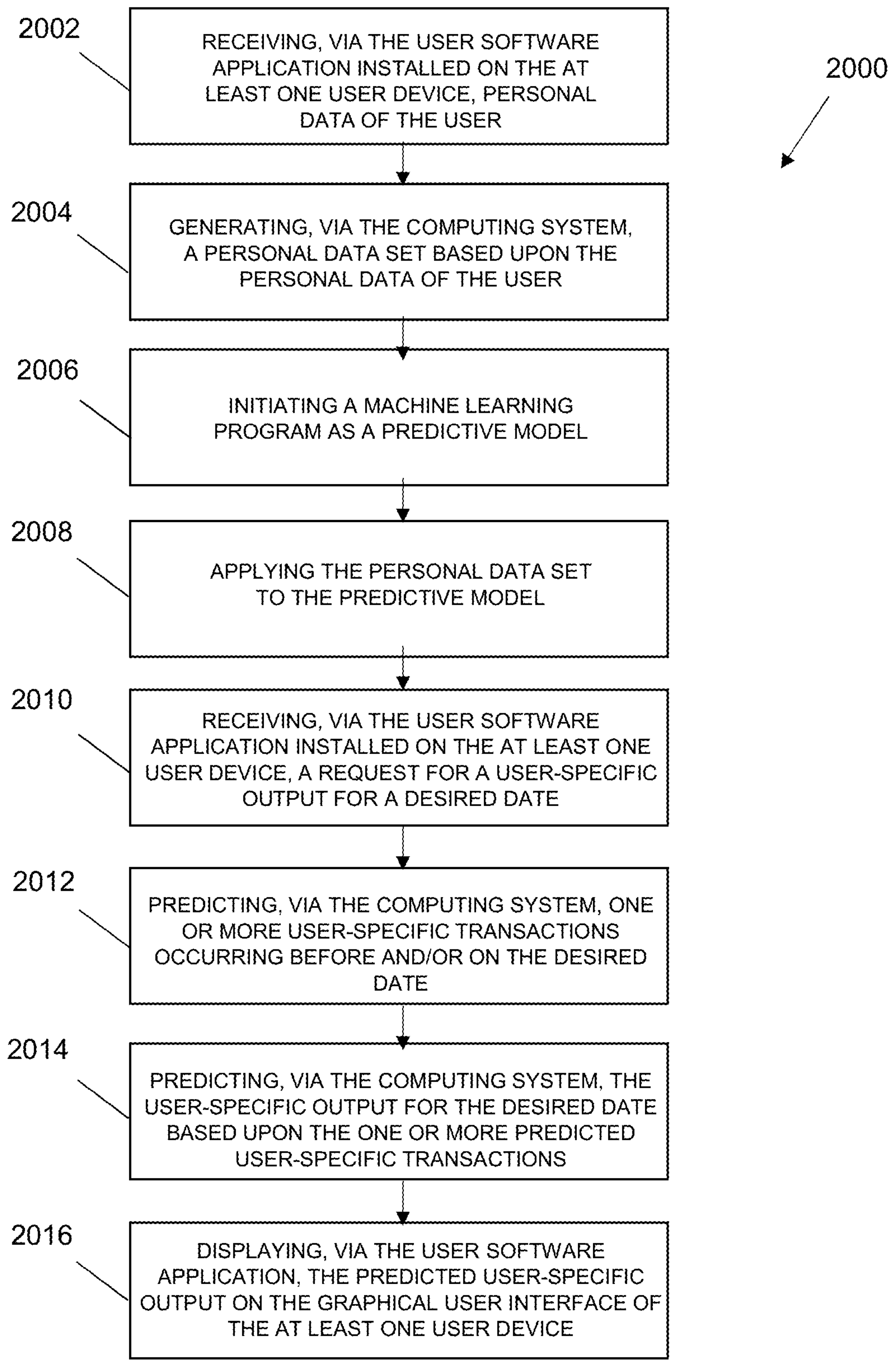
FIG. 8 is a flow diagram of an exemplary method for predicting one or more transactions and/or outputs according to the invention.

In a preferred embodiment, the method 2000 of improved network data processing, depicted in FIG. 8, comprises at step 2002 receiving, via the user software application 132 the personal data of the user 110. Subsequently, at step 2004, the computing system 206 generates a personal data set based upon the personal data of the user 110. The computing system 206 then, at step 2006, initiates a machine learning program as a predictive model and, at step 2008, applies the personal data set to the predictive model. At step 2010, the enterprise system 200 receives, via the user software application 132 installed on the at least one user device (referring to either or both of the computing device 104 and the mobile device 106), a request for a user-specific output for a desired date. Thereafter, at step 2012, the enterprise system 200 predicts, via the computing system 206, one or more user-specific transactions occurring before and/or on the desired date. Based upon those one or more user-specific transactions, the enterprise system 200, predicts, via the computing system 206, the user-specific output for the desired date, at step 2014. The enterprise system 200 then, at step 2016, displays, via the user software application 132, the predicted user-specific output on the GUI of the at least one user device (referring to either or both of the computing device 104 and the mobile device 106).

As a non-limiting example, the enterprise system 200 predicts, via the computing system 206, a user-specific output by taking a current balance of the financial account of the user 110 and subtracting debit transactions (e.g., transfers out, scheduled bill payments, purchases, etc.) and adding credit transactions (e.g., transfers in, pending deposits, refunds, etc.) that occurred, or predicted to occur, before and/or on the desired date which have not already been included in the current balance.

In certain instances, the predicted user-specific output for a user 110 has a greater percentage of accuracy relative to an actual user-specific output of such user 110 than a user-specific output provided by conventional systems. For example, a predicted balance of a financial account of the user 110 determined by the enterprise system 200 may be more accurate and closer to an actual balance of the financial account for a desired date than a current balance provided by the conventional systems.

In some embodiments, the enterprise system 200 may transmit a communication containing a notification (e.g., an alert). The enterprise system 200 may transmit the communication based on the triggering conditions described hereinabove and/or at least on one of a plurality of preconfigured rules and criteria. In an embodiment, the plurality of preconfigured rules and criteria may be defined based on a user input and/or regulations. Since the enterprise system 200 is extensible and flexible, the communications defined herein are not static, and can be updated by adding, deleting, and/or replacing rules and criteria. For example, the user 110 may configure rules and criteria for the enterprise system 200 or, alternatively, the enterprise system 200 may be automatically configured, to send the communication containing the notification when the predicted user-specific output meets certain triggering conditions such as a minimum threshold of a balance of the financial account. As non-limiting examples, the communication may be transmitted by the enterprise system 200 to the user device (referring to either or both of the computing device 104 and the mobile device 106) at a point-of-sale prior to completion of a transaction of the user 110 to prevent overdraft of the financial account and/or after the completion of the transaction of the user 110 to notify the user 110 of anticipatory overdraft of the financial account. The communication may be sent to the corresponding user 110 by the enterprise system 200 using any known communication method. For example, an email, text message, push notification, a quick response (QR) code, or the like may be generated by the computing system 206 for communication to the corresponding user 110 or as a communication provided, via the application 132, on the GUI of the user device (referring to either or both of the computing device 104 and the mobile device 106). Such a communication may be communicated from the computing system 206 to the user devices, referring to either or both of the computing device 104 and mobile device 106 of the user 110 using any of the methods described hereinabove in describing the communication capabilities of the devices 104, 106 and systems 200, 206 within FIG. 1. Such communications may be beneficial to the user 110 to prevent overdraft of the financial account and avoid additional fees and charges.

Overall, the improved data processing of the enterprise system 200 helps the user 110 manage finances effectively by keeping track of how much money is available to spend or save. Predicting user-specific transactions and/or user-specific outputs may prevent overdrafts, which can result in fees and other financial penalties to the user 110. As such, the enterprise system 200 enables the user 110 to budget more effectively by understanding transactions, and allowing the user 110 to plan for upcoming debits and credits. Predicting the transactions and/or outputs may also allow the user 110 to quickly recognize any unauthorized transactions or potential fraudulent activity on the financial account. By knowing the predicted user-specific output, the user 110 can also make informed decisions about future transactions, such as saving for emergencies, investments, or large purchases. Overall, the enterprise system 200 allows the user 110 to stay informed about his or her financial accounts, which is essential for maintaining financial stability and making smart money management decisions.

Additionally, the enterprise system 200 benefits from the disclosed methods as a result of the reduction in the need for additional customer or client engagement by decreasing the number of personal data requests from each user 110 related to his or her financial accounts, or eliminating all such requests, depending on the circumstances. The disclosed method also ensures that the most appropriate or useful actions be taken by the enterprise system 200 such that the impression of the enterprise system 200 related to financial support is improved with respect to the user 110, and may also facilitate an improvement in the relationship between the enterprise system 200 and the user 110.

The use of the machine learning program and resulting predictive model also improves the efficiency of the operation of the computing system 206 in various different respects. First, the disclosed method provides an ability for the computing system 206 to eliminate unnecessary calculations and communications performed by the human agents 210 and/or the computing system 206 that have been found to not have a positive impact on the enterprise system 200 and/or the user 110. The computing system 206 may be configured to automatically introduce changes to data processing via the review of such prediction data. This results in the human agents 210 and/or the computing system 206 avoiding a waste of resources when performing certain tasks, such as sending unnecessary or unwanted communications of various forms to users 110 that will never interact with or benefit from the sending of such communications. The use of the machine learning program also allows for certain variables in the personal data of the user 110 to be predicted and further allows for the computing system 206 to be simplified by means of the elimination of undesired interactions with the users 110. Each of the described advantages improves data processing and reduces network traffic as experienced by the computing system 206 due to the ability to manage the personal data of the user 110.

Operations of the methods, and combinations of operation in the methods, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the method.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A method for predicting a user-specific output for a desired date, comprising:

receiving, by a computing system comprising a processor and a memory and a network connection to at least one user device, personal data associated with a user via a user software application executing on the at least one user device, wherein the personal data comprises transaction history data, account setting data including scheduled payments and frequency of credits and debits, and recorded interactions of the user with the user software application;

generating, by the computing system, a personal data set from the received personal data;

initiating, by the computing system, a machine learning program as a predictive model trained on personal data sets of a plurality of users;

applying, by the computing system, the personal data set to the predictive model;

receiving, by the computing system, a request for the user-specific output for the desired date, wherein the desired date is selected by the user via the user software application;

predicting, by the computing system based on the predictive model and without requiring manual input of transactions by the user, user-specific transactions predicted to occur before or on the desired date that are not already included in a current balance of the user;

predicting, by the computing system, the user-specific output based on the predicted user-specific transactions, wherein the user-specific output comprises the current balance adjusted by predicted debit transactions and predicted credit transactions occurring before or on the desired date and not already included in the current balance;

displaying the predicted user-specific output on a graphical user interface (GUI) of the user software application; and triggering, by the computing system, a communication to the at least one user device over the network connection when the predicted user-specific output satisfies a threshold condition to prevent an overdraft.

2. The method of claim 1, wherein the predicted user-specific output has a percentage of accuracy relative to an actual output greater than a percentage of accuracy of a conventional output relative to the actual output for the desired date.

3. The method of claim 1, further comprising transmitting, via the computing system, an electronic communication related to the predicted user-specific output to the at least one user device, wherein the electronic communication comprises at least one of an email, a text message, a push notification, or a quick response (QR) code.

4. The method of claim 1, wherein the predicted user-specific output includes the predicted user-specific transactions.

5. The method of claim 1, wherein predicting the user-specific transactions comprises correlating the personal data set of the user to the predictive model using at least one of pattern recognition, similarity analysis, or machine learning classification.

6. The method of claim 1, wherein the predictive model predicts the user-specific transactions when a determined probability that the personal data set of the user corresponds to the predicted user-specific transactions exceeds a threshold value of probability.

7. A non-transitory computer-readable medium storing instructions that, when executed by a processor, cause the processor to:

receive personal data associated with a user via a user software application executing on at least one user device, wherein the personal data comprises transaction history data, account setting data including scheduled payments and frequency of credits and debits, and recorded interactions of the user with the user software application;

generate a personal data set from the received personal data;

initiate a machine learning program as a predictive model trained on personal data sets of a plurality of users;

apply the personal data set to the predictive model;

receive a request for a user-specific output for a desired date, wherein the desired date is selected by the user via the user software application;

predict, based on the predictive model and without requiring manual input of transactions by the user, user-specific transactions predicted to occur before or on the desired date that are not already included in a current balance of the user;

predict the user-specific output based on the predicted user-specific transactions, wherein the user-specific output comprises the current balance adjusted by predicted debit transactions and predicted credit transactions occurring before or on the desired date and not already included in the current balance;

display the predicted user-specific output on a graphical user interface (GUI) of the user software application; and trigger a communication to the at least one user device over a network connection when the predicted user-specific output satisfies a threshold condition to prevent an overdraft.

8. The non-transitory computer-readable medium of claim 7, wherein the instructions further cause the processor to transmit an electronic communication related to the predicted user-specific output to the at least one user device, wherein the electronic communication comprises at least one of an email, a text message, a push notification, or a quick response (QR) code.

9. A computing system, comprising:

a processor; and a memory storing computer-readable instructions that, when executed by the processor, cause the computing system to:

receive personal data associated with a user via a user software application executing on at least one user device connected to the computing system via a network connection, wherein the personal data comprises transaction history data, account setting data including scheduled payments and frequency of credits and debits, and recorded interactions of the user with the user software application;

generate a personal data set from the received personal data;

initiate a machine learning program as a predictive model trained on personal data sets of a plurality of users;

apply the personal data set to the predictive model;

receive a request for a user-specific output for a desired date, wherein the desired date is selected by the user via the user software application;

predict, based on the predictive model and without requiring manual input of transactions by the user, user-specific transactions predicted to occur before or on the desired date that are not already included in a current balance of the user;

predict the user-specific output based on the predicted user-specific transactions, wherein the user-specific output comprises the current balance adjusted by predicted debit transactions and predicted credit transactions occurring before or on the desired date and not already included in the current balance;

display the predicted user-specific output on a graphical user interface (GUI) of the user software application; and trigger a communication to the at least one user device over the network connection when the predicted user-specific output satisfies a threshold condition to prevent an overdraft.

10. The system of claim 9, wherein, upon execution of the computer-readable instructions, the computing system is further configured to transmit an electronic communication related to the predicted user-specific output to the at least one user device, wherein the electronic communication comprises at least one of an email, a text message, a push notification, or a quick response (QR) code.

11. The system of claim 9, wherein the predicted user-specific transactions are predicted by correlating the personal data set of the user to the predictive model using at least one of pattern recognition, similarity analysis, or machine learning classification.

12. The system of claim 9, wherein the predicted user-specific output for the desired date is predicted when a determined probability associated with the predicted user-specific transactions exceeds a threshold value of probability.

* * * * *